United States Patent
Maehira et al.

(10) Patent No.: US 8,707,183 B2
(45) Date of Patent: Apr. 22, 2014

(54) DETECTION OF A USER'S VISUAL IMPAIRMENT BASED ON USER INPUTS OR DEVICE SETTINGS, AND PRESENTATION OF A WEBSITE-RELATED DATA FOR SIGHTED OR VISUALLY-IMPAIRED USERS BASED ON THOSE INPUTS OR SETTINGS

(75) Inventors: Hirotoshi Maehira, Nagoya (JP); Masahiro Fujishita, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 469 days.

(21) Appl. No.: 12/332,548

(22) Filed: Dec. 11, 2008

(65) Prior Publication Data

US 2009/0150787 A1    Jun. 11, 2009

(30) Foreign Application Priority Data

Dec. 11, 2007    (JP) ................................ 2007-319778

(51) Int. Cl.
| | |
|---|---|
| G06F 3/00 | (2006.01) |
| G06F 3/048 | (2013.01) |
| G10L 13/00 | (2006.01) |
| G10L 13/08 | (2013.01) |
| G10L 21/06 | (2013.01) |
| G10L 25/00 | (2013.01) |

(52) U.S. Cl.
USPC ........... 715/729; 715/733; 715/778; 715/865; 704/260; 704/271

(58) Field of Classification Search
USPC ........... 715/729, 733, 778, 865; 704/260, 271
See application file for complete search history.

(56) References Cited

U.S. PATENT DOCUMENTS 5,201,034 A * 4/1993 Matsuura et al. ............. 715/865
5,704,031 A   12/1997 Mikami et al.
(Continued)

FOREIGN PATENT DOCUMENTS

| CN | 1291753 A | 4/2001 |
|---|---|---|
| CN | 101034542 A | 9/2007 |

(Continued)

OTHER PUBLICATIONS

Jacko, et al., "Visual Profiles: A Critical Component of Universal Access," Chi '99, pp. 330-337.*

(Continued)

*Primary Examiner* — Tadeese Hailu
*Assistant Examiner* — Eric J Bycer
(74) *Attorney, Agent, or Firm* — Scully, Scott, Murphy & Presser, P.C.

(57) ABSTRACT

A data processing device is connected to a web data providing unit that provides web data via a network. The web data has at least one of first web data and second web data corresponding to the first web data. A screen reader can be installed on the data processing device. The displaying unit displays the web data. The screen reader voices the first web data displayed on the displaying unit and fails to voice the second web data displayed on the displaying unit. The acquiring unit acquires the web data from the web data providing unit. The determining unit determines, based on visually impaired information indicating that the user is a visually impaired, whether or not the acquiring unit should acquire the first web data from the web data providing unit even if the user instructs the acquiring unit to acquire the second web data from the web data providing unit.

10 Claims, 11 Drawing Sheets

(56) References Cited

U.S. PATENT DOCUMENTS

| | | | |
|---|---|---|---|
| 5,801,692 A * | 9/1998 | Muzio et al. | 715/764 |
| 5,899,975 A * | 5/1999 | Nielsen | 704/270.1 |
| 6,046,722 A * | 4/2000 | McKiel, Jr. | 715/862 |
| 6,061,666 A | 5/2000 | Do et al. | |
| 6,078,951 A | 6/2000 | Pashupathy et al. | |
| 6,192,341 B1 * | 2/2001 | Becker et al. | 704/271 |
| 6,269,480 B1 | 7/2001 | Curtis | |
| 6,394,915 B1 * | 5/2002 | Nesbitt | 473/378 |
| 6,464,135 B1 | 10/2002 | Cohen et al. | |
| 6,546,431 B1 * | 4/2003 | Brown et al. | 719/313 |
| 6,591,008 B1 * | 7/2003 | Surve et al. | 382/162 |
| 6,624,803 B1 * | 9/2003 | Vanderheiden et al. | 345/156 |
| 6,687,781 B2 * | 2/2004 | Wynne et al. | 710/317 |
| 6,697,781 B1 * | 2/2004 | Sahlberg | 704/260 |
| 6,874,127 B2 | 3/2005 | Newell et al. | |
| 6,922,726 B2 * | 7/2005 | Basson et al. | 709/227 |
| 6,934,915 B2 * | 8/2005 | Rudd et al. | 715/765 |
| 6,948,136 B2 * | 9/2005 | Trewin | 715/865 |
| 6,963,937 B1 * | 11/2005 | Kamper et al. | 710/73 |
| 6,981,246 B2 * | 12/2005 | Dunn | 717/127 |
| 7,010,581 B2 * | 3/2006 | Brown et al. | 709/218 |
| 7,051,096 B1 | 5/2006 | Krawiec et al. | |
| 7,062,547 B2 * | 6/2006 | Brown et al. | 709/221 |
| 7,089,499 B2 * | 8/2006 | Steichen et al. | 715/744 |
| 7,103,551 B2 * | 9/2006 | King et al. | 704/271 |
| 7,251,344 B2 * | 7/2007 | Sakata et al. | 382/100 |
| 7,308,405 B2 | 12/2007 | Rose | |
| 7,554,522 B2 * | 6/2009 | Sinclair et al. | 345/156 |
| 7,676,549 B2 * | 3/2010 | McKeon et al. | 709/217 |
| 2002/0120645 A1 | 8/2002 | Adapathya et al. | 707/501.1 |
| 2002/0129100 A1 | 9/2002 | Dutta et al. | |
| 2002/0156807 A1 * | 10/2002 | Dieberger | 707/501.1 |
| 2002/0178007 A1 * | 11/2002 | Slotznick et al. | 704/270.1 |
| 2003/0182446 A1 | 9/2003 | Koide et al. | |
| 2003/0204730 A1 | 10/2003 | Barmettler et al. | |
| 2004/0070612 A1 * | 4/2004 | Sinclair et al. | 345/762 |
| 2004/0078334 A1 * | 4/2004 | Malcolm et al. | 705/50 |
| 2004/0103167 A1 * | 5/2004 | Grooters et al. | 709/217 |
| 2004/0150670 A1 * | 8/2004 | Feldman et al. | 345/781 |
| 2004/0268360 A1 | 12/2004 | Atkin et al. | |
| 2005/0033577 A1 | 2/2005 | Bradley et al. | |
| 2005/0039137 A1 * | 2/2005 | Bellwood et al. | 715/801 |
| 2005/0050447 A1 * | 3/2005 | Guckian et al. | 715/500.1 |
| 2005/0060046 A1 | 3/2005 | Ito et al. | |
| 2005/0071165 A1 * | 3/2005 | Hofstader et al. | 704/270.1 |
| 2005/0108642 A1 * | 5/2005 | Sinclair, II | 715/700 |
| 2006/0053372 A1 * | 3/2006 | Adkins et al. | 715/709 |
| 2006/0063138 A1 * | 3/2006 | Loff et al. | 434/112 |
| 2006/0209016 A1 * | 9/2006 | Fox et al. | 345/156 |
| 2006/0212548 A1 | 9/2006 | Faisal et al. | |
| 2006/0288283 A1 * | 12/2006 | Schrepp et al. | 715/700 |
| 2007/0016876 A1 * | 1/2007 | Schultz | 715/802 |
| 2007/0055938 A1 * | 3/2007 | Herring et al. | 715/729 |
| 2007/0100638 A1 | 5/2007 | Brunet et al. | |
| 2007/0168891 A1 | 7/2007 | Damery et al. | |
| 2007/0255569 A1 * | 11/2007 | Baker | 704/270 |
| 2008/0005679 A1 * | 1/2008 | Rimas-Ribikauskas et al. | 715/745 |
| 2008/0162558 A1 | 7/2008 | Rao | |
| 2008/0256436 A1 * | 10/2008 | Atkin et al. | 715/234 |
| 2009/0089718 A1 * | 4/2009 | Pompilio et al. | 715/865 |
| 2009/0113306 A1 | 4/2009 | Fujishita et al. | |
| 2009/0138268 A1 | 5/2009 | Maehira et al. | |
| 2009/0150787 A1 | 6/2009 | Maehira et al. | |
| 2010/0083192 A1 * | 4/2010 | Zaman et al. | 715/866 |

FOREIGN PATENT DOCUMENTS

| | | |
|---|---|---|
| EP | 1 087 345 A2 | 3/2001 |
| JP | 2002-14893 | 1/2002 |
| JP | 2002-229578 | 8/2002 |
| JP | 2002-288071 | 10/2002 |
| JP | 2003-283559 | 10/2003 |
| JP | 2005-92504 | 4/2005 |
| JP | 2005-166009 | 6/2005 |
| JP | 2006-268581 | 10/2006 |
| JP | 3135581 | 9/2007 |
| JP | 2009-104436 | 5/2009 |
| JP | 2009-129313 | 6/2009 |
| JP | 2009-134370 | 6/2009 |
| JP | 2009-145965 | 7/2009 |

OTHER PUBLICATIONS

Microsoft Windows XP Professional Resource Kit Accessibility Tools, available at http://technet.microsoft.com/en-us/library/bb45712.aspx, Nov. 3, 2005.*

Awde, et al., "Information Access in a Multimodal Multimedia Computing System for Mobile Visually-Impaired Users," IEEE ISIE 2006, pp. 2834-2839.*

"Count mouse clicks-VBForums," retrieved from www.vbforums.com/sowthread.php?329992-Count-mouse-clicks on Sep. 30, 2013, Mar. 21-22, 2005, 4 pages.*

"how to count num of mouse clicks if i lose focus," retrieved from www.nullskull.com/q/82630/how-to-count-num-of-mouse-clicks-if-i-lose-focus.aspx on Sep. 30, 2013, Aug. 8-9, 2006, 5 pages.*

"Gabe's TypOmeter v2," retrieved from www.informatics.no et al., on Sep. 30, 2013, 2002, 22 pages.*

United States Official Action dated Mar. 21, 2011 from related U.S. Appl. No. 12/257,576.

United States Official Action dated Mar. 21, 2011 from related U.S. Appl. No. 12/324,463.

Chinese Official Action dated Oct. 20, 2011 from related application CN 200810172906.6.

United States Office Action dated Jan. 27, 2012 received in related U.S. Appl. No. 12/257,576.

United States Office Action dated Mar. 2, 2012 received in related U.S. Appl. No. 12/324,463.

Japanese Official Action dated Aug. 21, 2012 from related application JP 2007-308085 together with an English language translation.

Japanese Official Action dated Nov. 1, 2011 from related application JP 2007-276110.

Japanese Official Action dated Jan. 17, 2012 from related application JP 2007-305558.

United States Office Action dated Apr. 15, 2013 received in related U.S. Appl. No. 12/324,463.

United States Official Action dated Nov. 20, 2013 from related U.S. Appl. No. 12/324,463.

* cited by examiner

FIG.2(a)

SAMPLE CONTENT FOR A WEB PAGE A STORED IN WEB SERVER 100

```
<html>
<head>   · · · · ·   </head>
<body>
 · · · · ·

<object date="file X"   · · · · ·   >
<embed src="file Y"   · · · · ·   >
<noembed>
<a href="the URL C">display text</a>
</noembed>

· · · · ·
</object>

<a href="the URL D">site map</a>

</body>
</html>
```

FIG.2(b)

SAMPLE CONTENT FOR A WEB PAGE B STORED IN WEB SERVER 100

```
<html>
<head>   · · · · ·   </head>
<body>
 · · · · ·

<applet code="file Z">
 · · · · ·
</applet>

<a href="the URL C">skip</a>

</body>
</html>
```

EXPLANATORY DIAGRAM SHOWING
THE STRUCTURE OF THE VIDEO ID
DATA TABLE MEMORY AREA14C2

EXPLANATORY DIAGRAM SHOWING
THE STRUCTURE OF THE LINK ID
DATA TABLE MEMORY AREA14C3

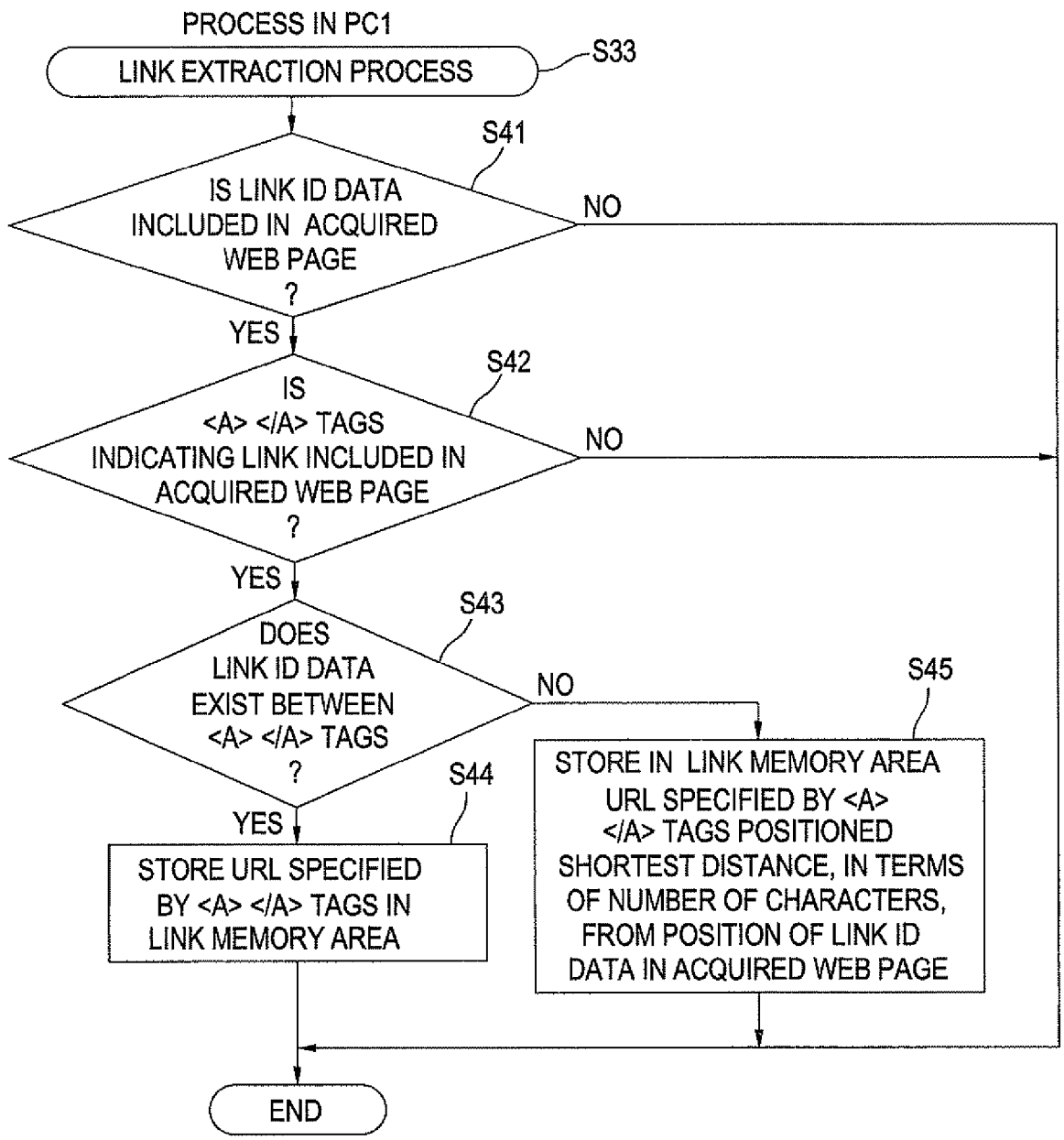

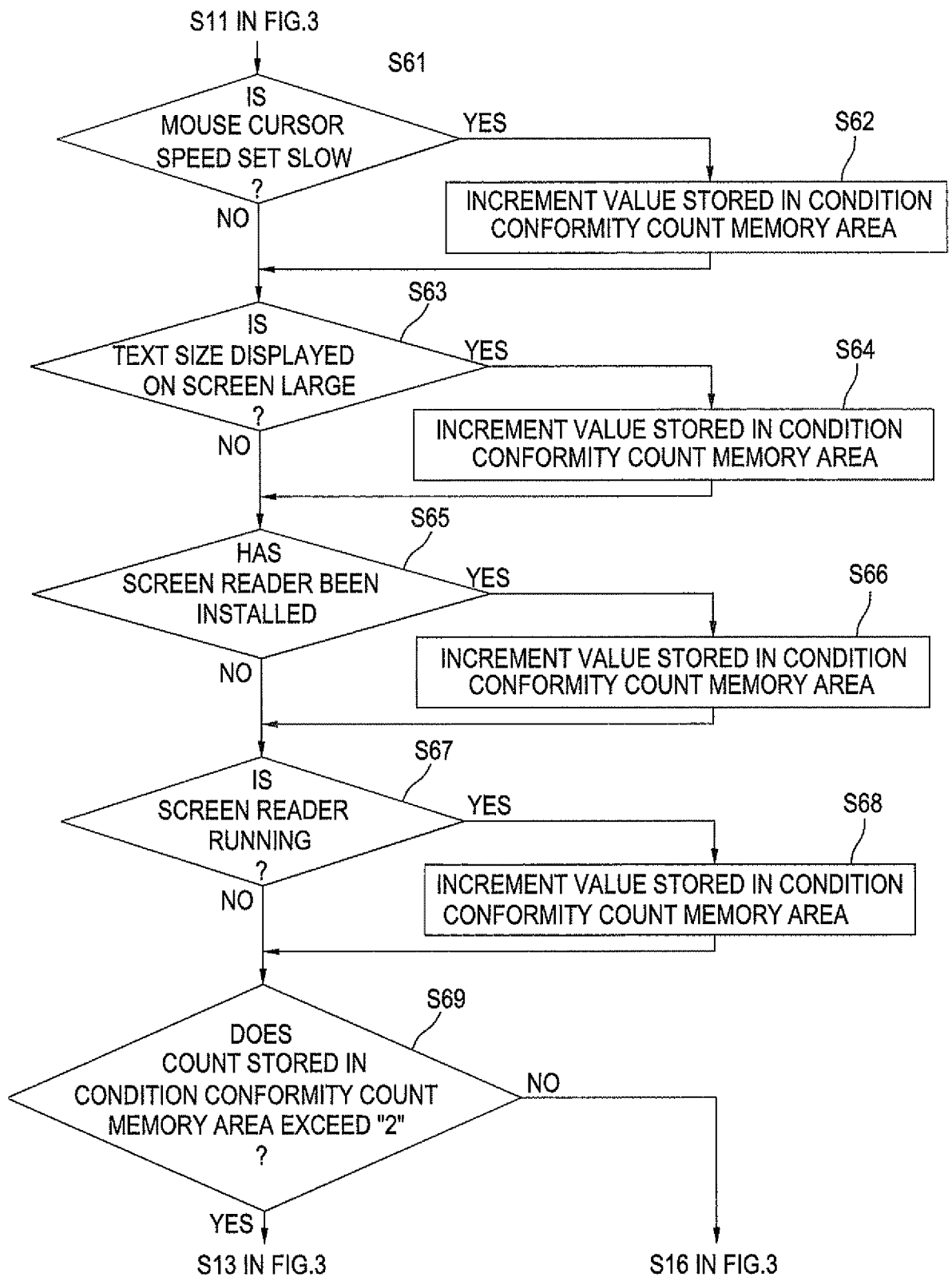

DETECTION OF A USER'S VISUAL IMPAIRMENT BASED ON USER INPUTS OR DEVICE SETTINGS, AND PRESENTATION OF A WEBSITE-RELATED DATA FOR SIGHTED OR VISUALLY-IMPAIRED USERS BASED ON THOSE INPUTS OR SETTINGS

CROSS REFERENCE TO RELATED APPLICATION

This application claims priority from Japanese Patent Application No. 2007-319778 filed Dec. 11, 2007. The entire content of this application is incorporated herein by reference.

TECHNICAL FIELD

The present invention relates to a data processing device and a computer-readable storage medium storing a set of program instructions executable on the data processing device.

BACKGROUND

Conventional data processing programs called screen readers function to convert text data displayed on a personal computer (hereinafter abbreviated as "PC") to voice that can be played audibly in order to assist people with visual impairments in using ordinary PCs. One such data processing program designed to support the visually impaired in using a PC is disclosed in Japanese unexamined patent application publication No. 2002-288071. This program provides a display area within the operation screen of a browser that acquires and displays World Wide Web (hereinafter referred to as "Web") data. The display area is used to display menus with links or other data, enabling the visually impaired to acquire Web data through simple operations. When the browser acquires menu data for the visually impaired in addition to the Web data, the program can display this menu data in the operation screen of the browser, making the browser more user-friendly to the visually impaired user.

SUMMARY

However, in the technology of Japanese unexamined patent application publication No. 2002-288071, when the browser acquires Web data including a video display command to display video that a screen reader would have difficulty voicing, the browser displays this video in the operation screen. However, since the screen reader cannot easily voice this data, a visually impaired user may not be able to understand the voiced content.

In view of the foregoing, it is an object of the present invention to provide a data processing device and a computer-readable storage medium storing a set of program instructions executable on the data processing device capable of acquiring alternate Web data having a greater potential for being voiced when acquiring Web data including a video display command for displaying video that a screen reader would have difficulty voicing, and capable of displaying this Web data in the operation screen.

In order to attain the above and other objects, the present invention provides a data processing device connected to a web data providing unit that provides web data via a network, and on which an OS and a screen reader can be installed. The web data has at least one of first web data and second web data corresponding to the first web data. The data processing device includes a displaying unit, an acquiring unit, a determining unit, and a controlling unit. The displaying unit displays the web data in at least one of a text character form and an image form. The first web data has a voicing part that a user can operate when the first web data is displayed on the displaying unit. The voicing part includes the text character. The screen reader voices the first web data displayed on the displaying unit and fails to voice the second web data displayed on the displaying unit. The acquiring unit acquires the web data from the web data providing unit. The determining unit determine, based on visually impaired information indicating that the user is a visually impaired, whether or not the acquiring unit should acquire the first web data from the web data providing unit even if the user instructs the acquiring unit to acquire the second web data from the web data providing unit. The controlling unit controls the acquiring unit to acquire the first web data when the determining unit determines that the acquiring unit should acquire the first web data, and configured to control the displaying unit to display the first web data.

Another aspect of the present invention provides a computer-readable storage medium storing a set of program instructions executable on a data processing device connected to a web data providing unit that provides web data via a network, and on which an OS and a screen reader can be installed. The web data has at least one of first web data and second web data corresponding to the first web data. The data processing device includes a displaying unit that displays the web data in at least one of a text character form and an image form. The first web data has a voicing part that a user can operate when the first web data is displayed on the displaying unit. The voicing part includes the text character. The screen reader voices the first web data displayed on the displaying unit and fails to voice the second web data displayed on the displaying unit. The program instructions includes a) determining, based on visually impaired information indicating that the user is a visually impaired, whether or not the first web data should be acquired from the web data providing unit even if a user instructs to acquire the second web data from the web data providing unit; b) acquiring the first web data, when it is determined in a) that the first web data should be acquired; and c) controlling the displaying unit to display the first web data, when it is determined in a) that the first web data should be acquired.

BRIEF DESCRIPTION OF THE DRAWINGS

The particular features and advantages of the invention as well as other objects will become apparent from the following description taken in connection with the accompanying drawings, in which:

FIG. 2(a) is an explanatory diagram showing sample content for a Web pagee A including a video display command;

FIG. 2(b) is an explanatory diagram showing sample content for a Web page B including a video display command;

FIG. 5 is a flowchart illustrating steps in a link extraction process performed on the PC;

FIG. 7(b) is a flowchart illustrating steps in a main process performed on the PC according to the third embodiment.

DETAILED DESCRIPTION

Next, preferred embodiments of the present invention will be described while referring to the accompanying drawings.

In a first embodiment of the present invention, a browser application (hereinafter simply referred to as "browser") is installed on a personal computer (hereinafter abbreviated as "PC") 1. When launched, the browser detects whether a screen reader has been installed on the PC 1. If a screen reader is installed on the PC 1 and the browser subsequently acquires a Web page displaying video that the screen reader may have difficulty voicing, the browser acquires an alternate Web page that has greater potential for being voiced and displays the alternate Web page in the operation screen of the browser. The greater potential for being voiced means that a part that a user can operate in the Web page includes a text.

Examples of video that are difficult to voice with a screen reader are Flash (registered trademark) movies, QuickTime (registered trademark) movies, and Java (registered trademark) programs called applets.

Below, the hardware configuration of the PC 1 will be described with reference to FIG. 1, a sample Web page acquired by the browser with reference to FIG. 2, and a main process performed by the browser with reference to FIG. 3.

Figure 1:
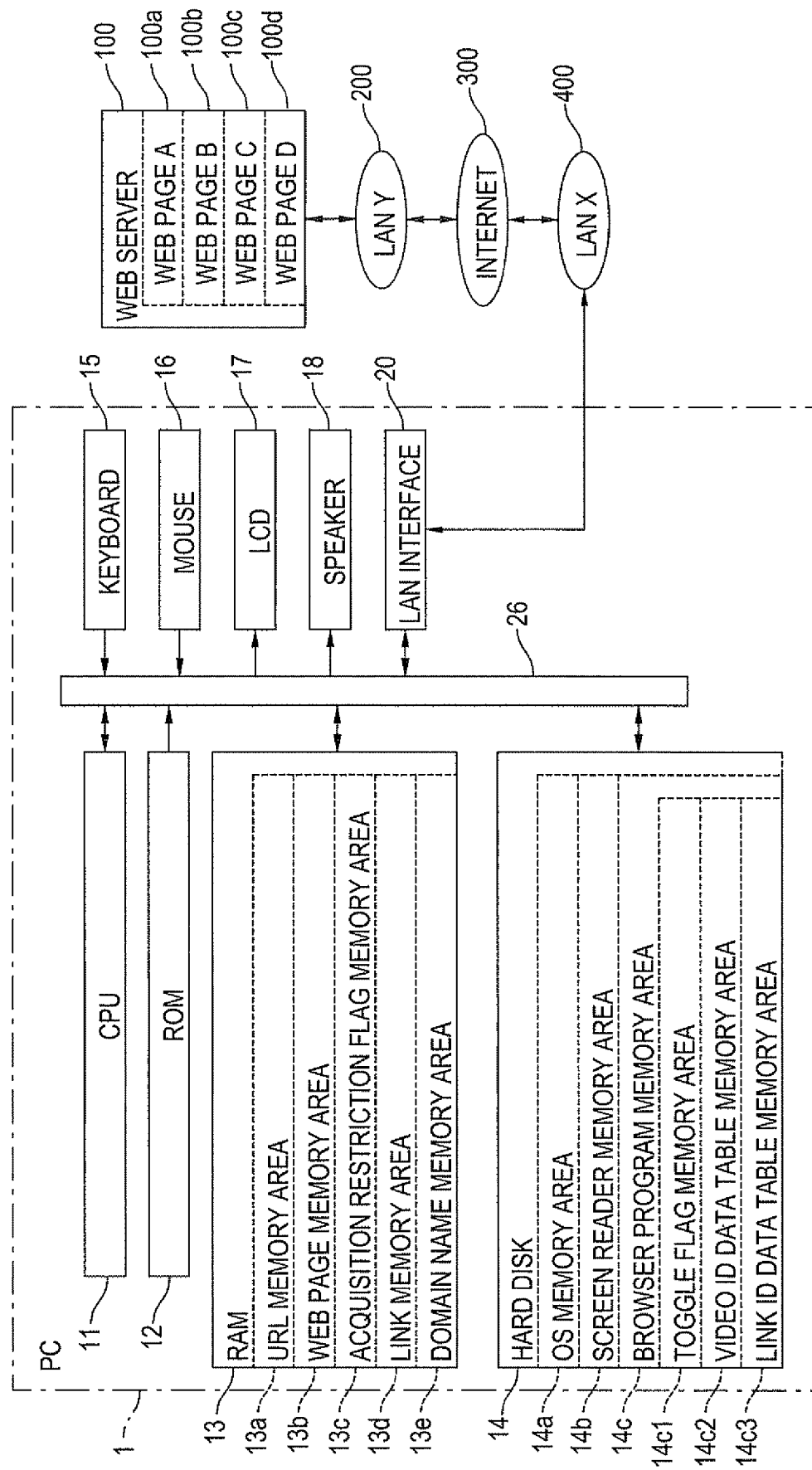
FIG. 1 is a block diagram showing the electrical structure of a PC according to a first embodiment of the present invention.

FIG. 1 is a block diagram showing the electrical structure of the PC 1 on which the browser according to the first embodiment of the present invention is installed, and the electrical structure of a Web server 100. The PC 1 is primarily configured of a CPU 11, a ROM 12, a RAM 13, a hard disk 14, a keyboard 15, a mouse 16, an LCD 17, a speaker 18, and a LAN interface 20, all of which components are interconnected via a bus line 26.

The CPU 11 controls the various functions possessed by the PC 1 and each component connected to the bus line 26 based on fixed values and programs stored on the ROM 12, RAM 13, and hard disk 14 or according to signals exchanged via the LAN interface 20. The ROM 12 is a non-rewritable memory storing control programs and the like executed on the PC 1. The RAM 13 is a rewritable volatile memory used to temporarily store various data when the CPU 11 executes operations on the PC 1.

The RAM 13 is provided with a URL memory area 13a, a Web page memory area 13b, an acquisition restriction flag memory area 13c, a link memory area 13d, and a domain name memory area 13e.

The URL memory area 13a stores a uniform resource locator (URL) for a Web page to be acquired by the browser, as will be described later.

A URL is an identifier used to identify a resource such as a device or data (a Web page, for example) on a network such as an internet 300 and to identify the communication protocol for communicating with or retrieving this resource. More specifically, a URL is configured of a scheme indicating the protocol used in communications or the like, a server name for the Web server 100 storing a Web page, a domain name identifying the network to which the Web server 100 belongs, a folder name on the Web server 100 in which the Web page is stored, and a filename of the Web page.

For example, if the URL is "http://hostname.*.co.jp/path/index.html," then "http://" indicates the protocol used in communications, "hostname" is the server name of the Web server 100 on which the Web page is stored, and "*.co.jp" is the domain name identifying the network to which the Web server 100 belongs. Examples of other possible domain names are "*.com", "*.gr", and "***.gov".

Further, "path" indicates the folder name on the Web server 100 in which the Web page is stored, and "index.html" indicates the filename of the Web page. If the user inputs a URL on the keyboard 15 or specifies a URL with the mouse 16, data for the URL is stored in the URL memory area 13a.

The Web page memory area 13b stores Web pages that the user gave instructions to acquire. A Web page is a text data file published on the Internet or other network and is primarily configured of character encoding conforming to a descriptive language called HyperText Markup Language (HTML). Character encoding is a method of assigning numerical codes to individual characters and symbols to facilitate the handling of characters and symbols on a computer.

HTML is a markup language well known in the art that a Web page designer uses to describe processes to be executed on a browser. HTML has a plurality of commands called "tags" for specifying these processes, with a tag name set for each detail in the process executed on the browser. These tags include a display command for directing the browser to display text in the operation screen in a prescribed color (<font> tag) and video display commands directing the browser to display a video that a screen reader may find difficult to voice. Although this will be described later in greater detail with reference to FIGS. 2(a) and 2(b), video display commands come in the form of <object> tags, <embed> tags, <applet> tags, and the like.

The acquisition restriction flag memory area 13c stores an acquisition restriction flag indicating whether or not a Web server from which a Web page is acquired is restricted. The acquisition restriction flag is set to "on" ("1", for example) when acquisition of a Web page is restricted and "off" ("0", for example) when acquisition of the Web page is not restricted and when the flag is initialized.

More specifically, when the browser has acquired a Web page including a video display command, the browser performs a link extraction process described later with reference to FIG. 5 to extract from the acquired Web page a URL for an alternate Web page having greater potential for being voiced by a screen reader. If the URL for the alternate Web page could not be extracted, the acquisition restriction flag is set to "on."

It is conceivable that Web pages related to the currently acquired Web page and alternate Web pages are stored on a Web server within the same network. Therefore, by restricting acquisition of Web pages to chose from Web servers of a specific domain, it is possible to decrease the likelihood of acquiring Web pages unrelated to the currently acquired Web page or unrelated to an alternate Web page.

Therefore, Web pages can be acquired from only the Web server 100 having the same domain name as that in the URL of the Web page for which a URL for an alternate Web page could not be extracted, while the acquisition restriction flag is set to "on."

The link memory area 13*d* stores URLs for alternate Web pages when URLs could be extracted in the link extraction process described later.

The domain name memory area 13*e* stores the domain name in the URL. When the URL for an alternate Web page was extracted in the link extraction process described later, the domain name in the URL stored in the URL memory area 13*a* is copied to the domain name memory area 13*e*. When the acquisition restriction flag is set to "on," an alternate Web page can be acquired from only the Web server having the domain name stored in the domain name memory area 13*e*.

The hard disk 14 is a rewritable, non-volatile memory. Hence, data stored on the hard disk 14 is preserved, even after the power supply to the PC 1 is turned off. The hard disk 14 is provided with an OS memory area 14*a*, a screen reader memory area 14*b*, and a browser program memory area 14*c*.

The OS memory area 14*a* stores an operating system (OS). The OS is a base program designed to manage components connected to the bus line 26 and is required when the operator uses the PC 1.

The OS is provided with a plurality of setting options related to input operations, as will be described later. By selecting one of the multiple choices provided for each setting, the user can customize the PC 1 for a more pleasant experience.

For example, the user can set the speed of a mouse cursor displayed on the LCD 17 faster or slower than a prescribed default speed (initial value set in the OS) and can set the size of text data displayed on the LCD 17 larger or smaller than a prescribed default text size (initial value set in the OS).

The screen reader memory area 14*b* stores a screen reader designed to convert text data displayed on the LCD 17 to voice. A screen reader functions to assist a visually impaired user in using the PC 1.

Text data displayed on the LCD 17 can be broadly divided into text data displayed according to character encoding and text data formed as images within an image or video. When a common screen reader is running on the PC 1, the screen reader converts text data displayed according to character encoding into voice signals and outputs voice through the speaker 13.

Since character encoding is formed of numerical values for facilitating the computer in handling characters and symbols, the screen reader can easily recognize the character encoding as text. However, the screen reader has difficulty recognizing text data formed as images in an image or video since the characters are images and, thus, has difficulty voicing this text data. In the preferred embodiment, the screen reader can convert the content of text data based on character encoding displayed in the operation screen of the browser into voice signals and can output the voice from the speaker 18.

The browser program memory area 14*c* stores a browser that acquires a user specified Web page from the Web server 100 connected to the PC 1 via the internet 300 and displays the content of the Web page in the operation screen.

Figure 3:
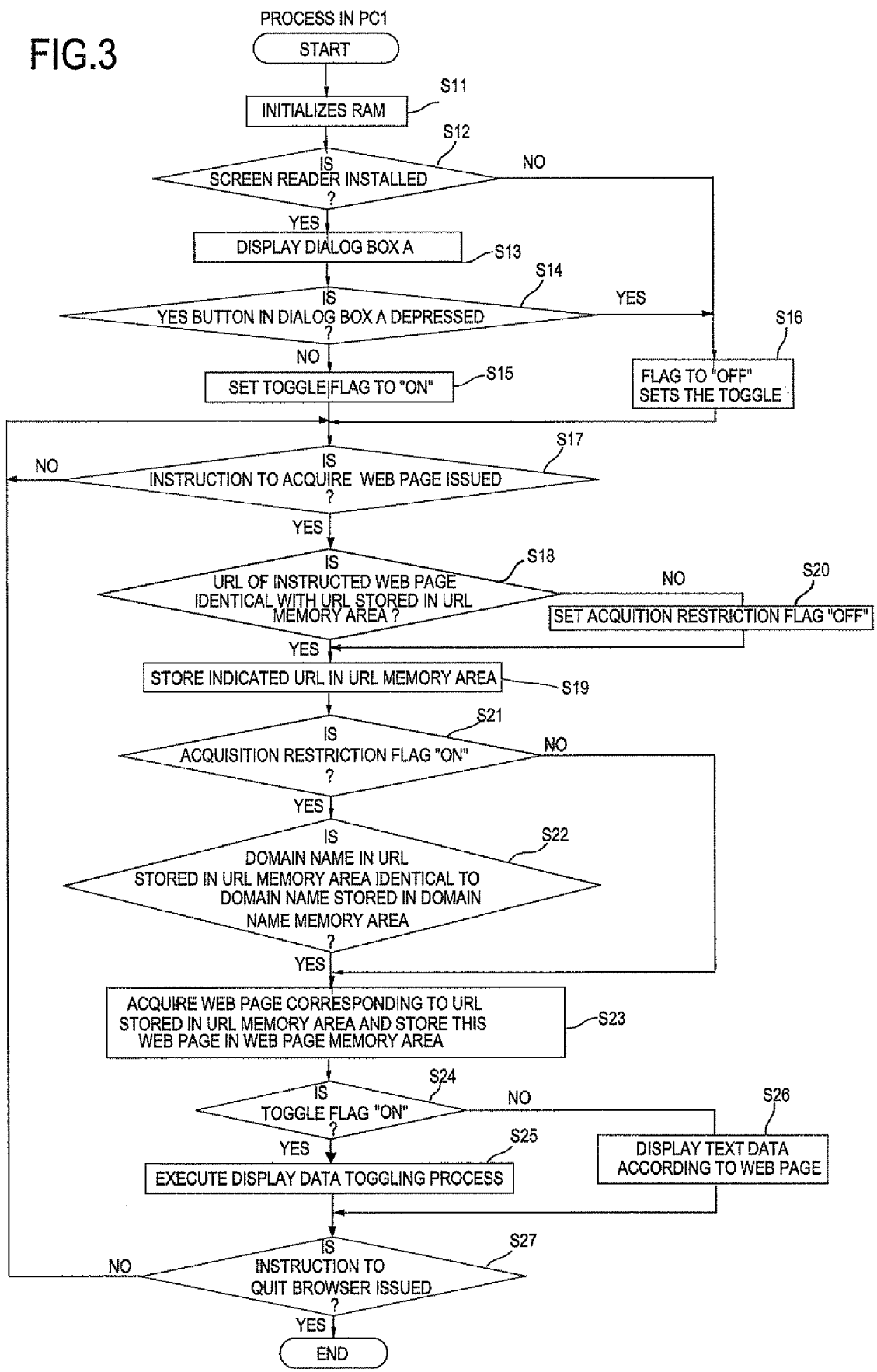
FIG. 3 is a flowchart illustrating steps in a main process performed on the PC.

The browser program memory area 14*c* stores programs for implementing a main process shown in the flowchart of FIG. 3, a display data toggling process shown in the flowchart of FIG. 4, and a link extraction process shown in the flowchart of FIG. 5.

The browser program memory area 14*c* is provided with a toggle flag memory area 14*c*1, a video ID data table memory area 14*c*2, and a link ID data table memory area 14*c*3.

The toggle flag memory area 14*c*1 stores a toggle flag indicating whether to acquire an alternate Web page having greater potential for being voiced when the browser acquires a Web page including video display commands. The toggle flag is set to "on" ("1", for example) when the browser acquires an alternate Web page with greater potential for being voiced and is set to "off" ("0", for example) when an alternate Web page was not acquired and when the flag is initialized.

The video ID data table memory area 14*c*2 stores video ID data in the form of a keyword. The CPU 11 determines that if the video ID data (keyword) is included in the Web page acquired by the browser, a video display command, that is, video data is included in the acquired Web page. The video ID data will be described later in greater detail with reference to FIG. 2(*c*).

The link ID data table memory area 14*c*3 stores link ID data in the form of a keyword. The CPU 11 determines that if the link ID data (keyword) is included in the Web page acquired by the browser, a URL of an alternate Web page having a greater potential for being voiced is included in the acquired Web page. The link ID data will be described later in greater detail with reference to FIG. 2(*d*).

The keyboard 15 is an input device having a plurality of keys. When the operator presses these keys, input signals corresponding to the pressed keys are inputted into the PC 1. The mouse 16 is a pointing device used to indicate display positions with a mouse cursor displayed on the LCD 17. When the operator moves the position of the mouse cursor with the mouse 16, an input signal corresponding to the amount of movement is inputted into the PC 1 and the display position of the mouse cursor is moved based on the input signal.

The mouse 16 has a mouse button that the user can operate while moving the position of the mouse cursor. When the user operates this button (hereinafter referred to as a "mouse click"), a prescribed input signal is inputted into the PC 1. By operating the keyboard 15 and the mouse 16, the user can modify various settings in the OS and the like and can use the browser and the like.

The LCD 17 functions to display operating procedures and the process status during the execution of operations, as well as data corresponding to keys pressed on the keyboard 15 and operations performed with the mouse 16. The speaker 18 outputs voice signals or the like provided by the screen reader as voice.

The LAN interface 20 is a circuit well known in the art for facilitating data communications with various external devices connected directly to a LAN X 400 and connected to the LAN X 400 via the internet 300 by connecting one end of a LAN cable to a connection port of the LAN interface 20 and the other end to the LAN X 400. Since the PC 1 is connected to the LAN X 400, the PC 1 is identified from the internee 300 side as a device belonging to the LAN X 400 network.

Next, the Web server 100 will be described. The Web server 100 is a device well known in the art for transmitting Web pages to a browser in response to a request from the browser for a Web page stored on the Web server 100.

The Web server 100 is connected to a LAN Y 200 and is capable of performing data communications with various external devices connected directly to the LAN Y 200 and connected to the LAN Y 200 via the internet 300. Since the Web server 100 is connected to the LAN Y 200, the Web server 100 is identified from the internet 300 side as a device belonging to the LAN Y 200 network.

The Web server 100 is provided with a Web page memory area 100*a* storing a Web pagee A, a Web page memory area 100*b* storing a Web page B, a Web page memory area 100*c* storing a Web page C, and a Web page memory area 100*d* storing a Web page D. The Web pages A and B each includes a video display command. The Web pages C and D serve as an alternate Web pages for the Web pagee A. The Web page C also serves as an alternate Web page for the Web page B. The Web pagee A is associated with URL A; Web page B is associated with URL B; Web page C is associated with URL C; and Web page D is associated with URL D.

Next, examples of Web pages A and B stored in the Web server 100 will be described with reference to FIGS. 2(a) and 2(b). FIG. 2(a) is an explanatory diagram showing sample content of Web pagee A containing a video display command, and FIG. 2(b) is an explanatory diagram showing sample content of Web page B including a different video display command.

As shown in FIGS. 2(a) and 2(b), Web pages A and B are files configured of character encoding based on HTML described above. Since HTML is a markup language well known in the art, the following description will cover only the video display commands and the URL C for the alternate Web page.

As shown in FIG. 2(a), the description for Web pagee A includes an <object> tag, an <embed> tag, a <noembed> tag, and an <a> tag. Of these, the <object> tag and the <embed> tag are video display commands for displaying video in the operation screen of the browser that a screen reader would find difficult to voice.

The <object> tag functions to display content of a file in one of various data formats in the operation screen of the browser. For example, if the <object> tag includes the description <object data="file X" . . . >, the browser acquires file X (a file of an arbitrary data format, such as an image, video, or text file) and displays this content.

The <embed> tag uses a plug-in function embedded in the browser to display content of a file having a data format corresponding to the plug-in function in the operation screen of the browser. For example, if the <embed> tag has the description <embed src="file Y" . . . >, the browser acquires file Y and displays the content of the file using the plug-in function.

The <noembed> tag is a description associated with the <embed> tag and specifies an alternate process for the browser to execute when the browser cannot use the plug-in function specified by the <embed> tag (i.e., cannot display a video that is difficult to voice). The alternate process to be executed by the browser is described between the tags <noembed> and </noembed>. Hence, the description between the tags may include text data to use in place of a video that the screen reader would have difficulty voicing or the URL of a different Web page having text data that can be used in place of the video.

The <a> tag functions to acquire a Web page specified by the user through an instruction (a mouse click, pressed key, or the like) and to display the content of the Web page in the operation screen of the browser. Since the <a> tag associates a Web page displayed in the operation screen with a different Web page, the <a> tag will hereinafter be referred to as a tag specifying a link (separate Web page).

For example, if the <a> tag has the description <a href="URL D"> Site Map </a>, the text data "Site Map" is displayed in the operation screen of the browser. If the user aligns the mouse pointer with the text data "Site Map" and performs a mouse click or selects this text data through key operations and presses the Enter key, the browser acquires the Web page associated with URL D and displays the content of this page in the operation screen. Here, URL D located in the <a> tag will be referred to as the URL specified by the <a> tag.

For example, if the Web page includes the description <noembed> <a href="URL C"> Display Text </a> </noembed>, the browser displays the text data "Display Text" in the operation screen of the browser when unable, to use the plug-in function. In other words, the user can acquire the Web page corresponding to URL C only when the browser cannot use the plug-in function. Therefore, it is highly likely that URL C located within the tags <noembed> and </noembed> indicates an alternate Web page.

Next, Web page B including a different display command from that in Web pagee A will be described.

FIG. 2(b) is an explanatory diagram showing sample content in Web page B, which includes a video display command different from that in Web pagee A. As shown in FIG. 2(b), the description in Web page B includes an <applet> tag and an <a> tag. The <applet> tag is one of the video display commands described above. A description of the <a> tag has already been given above.

The <applet> tag directs the browser to execute a program of a format called a Java (registered trademark) applet. For example, with the description <applet code="file Z" . . . >, the browser acquires and executes file Z (a program created in the Java language). When the browser executes the Java applet, a video, text data, or the like is displayed in the operation screen of the browser, for example.

Hence, when acquiring Web pagee A or Web page B including the video display commands described above, the browser displays a video in the operation screen. However, since screen readers have difficulty voicing videos, a visually impaired user will not be able to recognize the content in the acquired Web page.

Therefore, the browser according to the preferred embodiment extracts a URL from the acquired Web page for an alternate Web page with greater potential for being voiced. The browser acquires the alternate Web page corresponding to this URL and displays the content of the Web page in the operation screen.

In this way, the browser displays text data in the operation screen that the screen reader is more likely able to voice than the video. This is more user-friendly to a visually impaired user since the user can audibly hear and understand the content in the alternate Web page voiced by the screen reader.

Figure 2C:
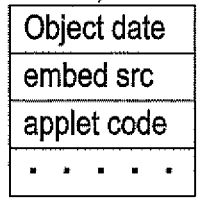
FIG. 2(c) is an explanatory diagram conceptually illustrating the content of a video ID data table.

Next, a video ID data table stored in the video ID data table memory area 14c2 of the hard disk 14 will be described with reference to FIG. 2(c). FIG. 2(c) is an explanatory diagram showing the structure of the video ID data table.

The video ID data table stores a plurality of video ID data keywords that is used to determine that a video display command is included in Web pages acquired by the browser.

For example, the keywords may be tag names used in HTML for displaying video in the operation screen of the browser. Hence, the video ID data table may store such keywords as "object data," "embed src," and "applet code." Further, the data may be text data or the like directing the user to play a video in the Web page, such as one of the keywords "play video," "play Flash," or "replay."

By allowing the user to edit (add, delete, etc.) video ID data in the video ID data table, the video ID data can be modified to suit Web pages that the user frequently accesses, thereby decreasing the likelihood that an Web page including a video data is acquired. Therefore, the likelihood that a desired alternate Web page can be acquired among a plurality of alternate Web page is increased.

Figure 2D:
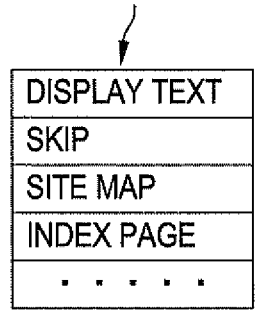
FIG. 2(d) is an explanatory diagram conceptually illustrating the content of a link ID data table.

Next, the link ID data stored in the link ID data table memory area 14c3 of the hard disk 14 will be described with reference to FIG. 2(d). FIG. 2(d) is an explanatory diagram showing sample content in the link ID data table.

The link ID data table stores a plurality of link ID data keywords that is used to determine that a URL of an alternate Web page that has a greater potential for being voiced is included in a Web page acquired by the browser.

The link ID data keywords are highly likely to be included between the tags <noembed> and </noembed> or the tags <a> and </a> in the acquired Web page, for example, and suggest that an alternate Web page exists. The example link ID data table shown in FIG. 2(d) includes the keywords "Display Text," "Skip," "Site Map," and "Index Page."

Further, the user may be allowed to edit this link ID data table to add or delete link ID data, for example. Allowing the user to modify link ID data to suit Web pages commonly used by the user increases the likelihood that an alternate Web page can be acquired.

Next, a main process executed by the CPU 11 of the PC 1 will be described with reference to FIG. 3.

FIG. 3 is a flowchart illustrating steps in the main process performed on the PC 1. The main process is performed to acquire an alternate Web page that has a greater potential for being voiced and to display the content of this alternate Web page in the operation screen of the browser when a Web page containing video display commands is acquired while a screen reader is installed on the PC 1. The CPU 11 executes this main process repeatedly while the browser is running.

In S11 of the main process, the CPU 11 initializes the memory areas 13a-13e in the RAM 13. In S12 the CPU 11 determines whether a screen reader is installed on the hard disk 14. For example, the CPU 11 may determine that a screen reader is installed when settings data for an existing screen reader is recorded in the registry, which functions to store settings data for the OS and various programs. As a variation of the process in S12, the CPU 11 may determine that a screen reader is installed on the hard disk 14 when files and folders related to an existing screen reader are stored on the hard disk 14.

If the CPU 11 determines that a screen reader is not installed in the hard disk 14 (S12: NO), the CPU 11 skips S13-S15, and in S16 the CPU 11 sets the toggle flag stored in the toggle flag memory area 14c1 of the hard disk 14 to "off" not to acquire an alternate Web page since the alternate Web page cannot be voiced even if acquired.

However, if the CPU 11 determines a screen reader is installed (S12: YES), in S13 the CPU 11 displays a dialog box A on the LCD 17 prompting the user to confirm whether to display video content if a Web page including a video display command is acquired.

Dialog box A will be described here with reference to FIG. 4(a).

Figure 4A:
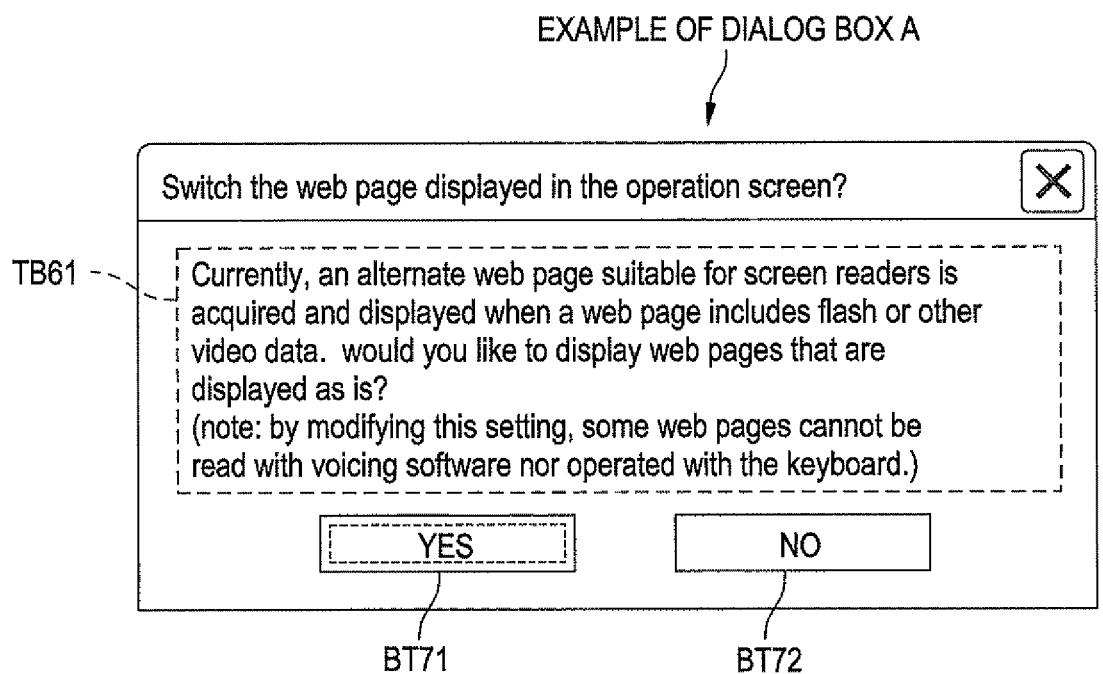
FIG. 4(a) is a screenshot showing an example of a dialog box A.

FIG. 4(a) is a screenshot showing an example of dialog box A. Dialog box A is displayed when a Web page including a video display command was acquired. When dialog box A is displayed, the user can input an instruction to acquire an alternate Web page or to display video content according to the acquired Web page without acquiring an alternate Web page.

Dialog box A is provided with a text box TB61 and buttons BT71 and BT72. The text box TB61 is a display region displaying a message to the user configured of text data, such as "In current setting, an alternate Web page suitable for screen readers is acquired and displayed when a Web page includes Flash or other video data. Would you like to modify this setting so that the acquired Web pages are displayed as is? (Note: this message cannot be read with voicing software, an operation cannot be performed for this message, with the keyboard.)"

The button BT71 enables the user to input an instruction for displaying video content according to the acquired Web page, without acquiring an alternate Web page. A button name "Yes" is assigned to the button BT71 and displayed therein. Specifically, when the button BT71 is selected, the toggle flag stored in the toggle flag memory area 14c1 of the hard disk 14 is set to "off."

The button BT72 allows the user to input an instruction to preserve the current setting for acquiring an alternate Web page. A button name "No" is assigned to the button BT72 and displayed therein. When the button BT72 is selected, the toggle flag is set to "on" and alternate Web pages are acquired. Dialog box A closes when one of the buttons BT71 and BT72 is pressed.

The text data displayed in the text box TB61 and the button names displayed in the buttons BT71 and BT72 are configured of images that cannot be voiced with a screen reader. Therefore, it is unlikely that a visually impaired user will modify the setting to display video content and, hence there is less likelihood that the setting will be modified to display video content when a visually impaired user is operating the PC 1.

This setting is changed to display video content in the operation screen of the browser when the user inputs such an instruction in dialog box A by selecting the button BT71. Hence, if the user of the PC 1 is sighted, the user can display video content by performing prescribed input operations when the option is set to acquire an alternate Web page, making this configuration convenient for sighted users.

Further, dialog box A is configured to receive input operations only through the mouse 16, and the option for displaying video content is set only when the button BT71 is pressed with the mouse 16. Since it is difficult for a visually impaired user to perform input operations using the mouse 16, it is unlikely that such a user will select the button BT71 to switch the option to the setting for displaying video content. Accordingly, when a visually impaired user is operating the PC 1, there is less likelihood that the option will be modified to display video content.

Returning to the flowchart in FIG. 3, after completing the process in S13, the CPU 11 determines in S14 whether the user pressed the Yes button BT71 in dialog box A displayed on the LCD 17. If the user pressed the Yes button BT71 (S14: YES), in S16 the CPU 11 sets the toggle flag stored in the toggle flag memory area 14c1 of the hard disk 14 to "off" not to acquire an alternate Web page.

However, if the No button BT72 was pressed in dialog box A (S14: NO), in S15 the CPU 11 sets the toggle flag to "on" to acquire an alternate Web page. As a variation to the process in S14, the CPU 11 may determine that the No button BT72 was pressed if an input operation is not performed on the buttons BT71 and BT72 within a prescribed time (one minute, for example) after dialog box A was displayed on the LCD 17 in S13.

In S17 the CPU 11 determines whether the user issued an instruction to acquire a Web page. The user issues such an instruction by inputting a URL on the keyboard 15 or specifying a URL with the mouse 16. While no instruction to acquire a Web page has been issued (S17: NO), the CPU 11 waits until an instruction is given.

When the CPU 11 determines that the user has issued an instruction to acquire a Web page (S17: YES), in S18 the CPU 11 determines that the URL of the Web page instructed in S17 is identical with the URL stored in the URL memory area 13a. When the identical URL is stored in the URL memory area 13a (S18: YES), in S19 the CPU 11 stores the inputted or indicated URL in the URL memory area 13a of the RAM 13. In the first time of this process, the process advances to S19 since a URL is not stored in the URL memory area 13a.

When the identical URL is not stored in the URL memory area 13a (S18: NO), in S20 the CPU 11 sets the acquisition restriction flag in the acquisition restriction flag memory area 13c to "off" so that the CPU 11 can acquire the instructed URL. In S21 the CPU 11 determines whether the acquisition restriction flag stored in the acquisition restriction flag memory area 13c is set to "on."

If the acquisition restriction flag is "on" (S21: YES), in S22 the CPU 11 determines whether the domain name in the URL stored in the URL memory area 13a matches the domain name stored in the domain name memory area 13e since an alternate Web page can be acquired from only the Web server having the domain name stored in the domain name memory area 13e.

If the domain name of the URL stored in the URL memory area 13a differs from the domain name in the domain name memory area 13e (S22: NO), the CPU 11 cannot acquire a Web page corresponding to the URL stored in the URL memory area 13a. Therefore, the CPU 11 returns to S17 and waits until a next instruction is given.

However, when the domain name in the URL stored in the URL memory area 13a matches the domain name in the domain name memory area 13e (S22: YES), in S23 the CPU 11 acquires a Web page corresponding to the URL stored in the URL memory area 13a and stores this Web page in the Web page memory area 13b.

On the other hand, if the acquisition restriction flag is "off" (S21: NO), the CPU 11 skips S22 and advances to S23 to acquire a Web page corresponding to the URL stored in the URL memory area 13a and stores this Web page in the Web page memory area 13b.

In S24 the CPU 11 determines whether the toggle flag stored in the toggle flag memory area 14c1 is set to "on." If the toggle flag is on (S24: YES), in S25 the CPU 11 executes the display data toggling process described later since it is allowed to acquire an alternate Web page. The display data toggling process is performed to switch the Web page displayed in the operation screen of the browser based on whether the Web page acquired in S23 includes video ID data indicating that the web page includes a video display command.

Then, in S27 the CPU 11 determines whether the user has indicated an instruction to quit the browser. If a quit instruction has been inputted (S27: YES), the CPU 11 ends the main process. However, if a quit instruction has not been inputted (S27: NO), the CPU 11 returns to S17 and waits until a next instruction is given.

If the CPU 11 determines that the toggle flag is off (S24: NO), in S26 the CPU 11 displays, without change, text data, still images, video, and the like in the operation screen of the browser according to the Web page stored in the Web page memory area 13b since it is not allowed to acquire an alternate Web page. Then, the CPU 11 advances to S27 described above.

Through the main process described in FIG. 3, the CPU 11 acquires an alternate Web page having a greater potential for being voiced and displays the content of this Web page in the operation screen of the browser under the condition that a Web page containing a video display command is acquired while a screen reader is installed on the PC 1.

Since a screen reader is a program for aiding visually impaired users in using a PC, there is a good chance that a visually impaired user is using the PC when a screen reader is installed thereon. Accordingly, the CPU 11 acquires an alternate Web page that has a greater potential for being read by a screen reader and displays the content of the page in the operation screen of the browser under the condition that a Web page including video display commands has been acquired for a PC that is likely used by a visually impaired user.

As a result, the screen reader has a greater potential for voicing the data displayed in the operation screen of the browser than when the Web page with video content is displayed in the operation screen. This is very convenient for a visually impaired user since the user can audibly hear and understand the content when the data displayed in the operation screen of the browser is voiced.

On the other hand, if a screen reader is not installed on the PC 1, i.e., when a sighted user is operating the PC 1, the video content is displayed in the operation screen of the browser, thus being more convenient for the sighted user.

Next, the display data toggling process (S25 of FIG. 3) executed by the CPU 11 of the PC 1 will be described with reference to FIG. 4(b).

Figure 4B:
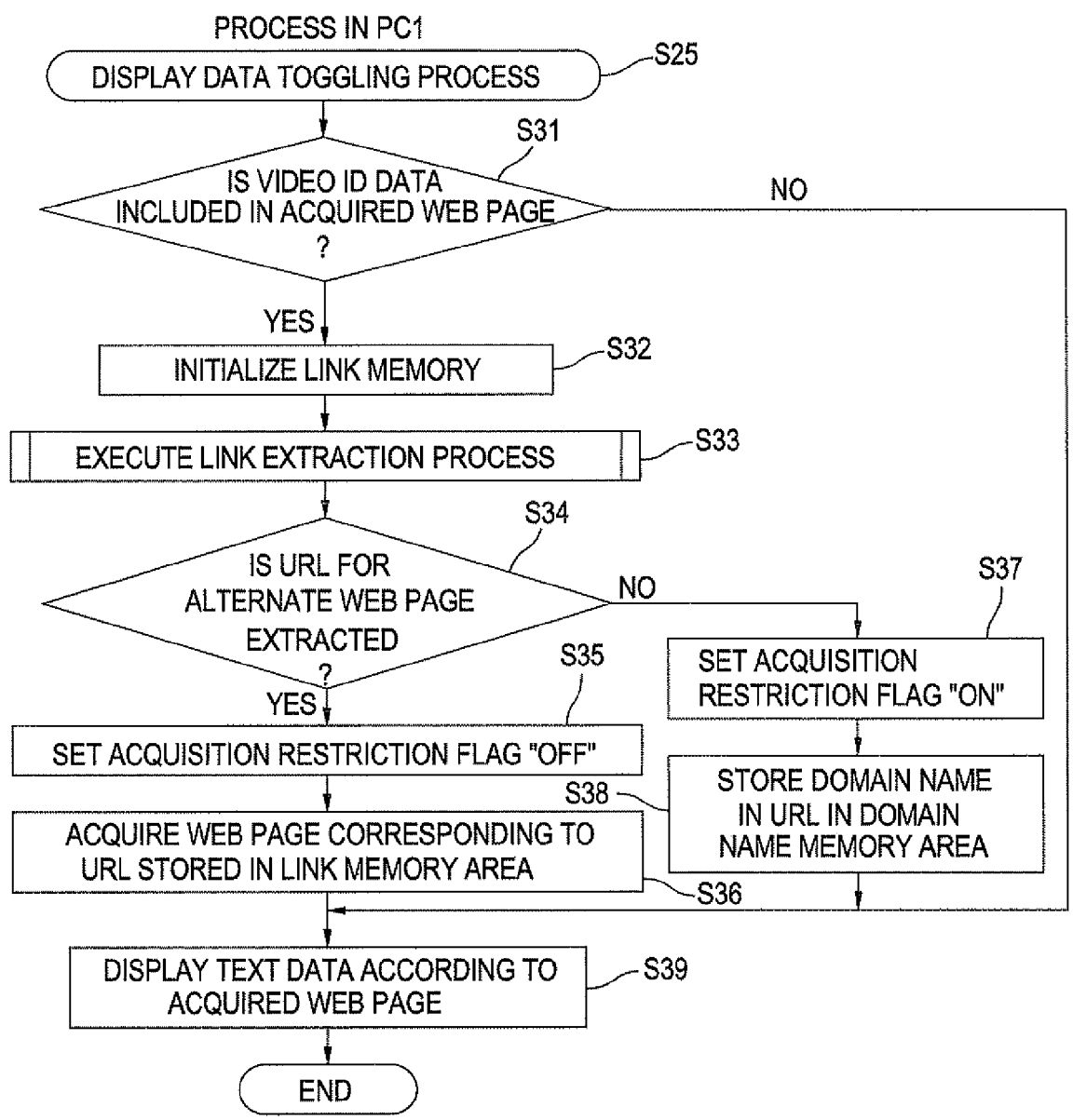
FIG. 4(b) is a flowchart illustrating steps in a display data toggling process performed on the PC.

FIG. 4(b) is a flowchart illustrating steps in the display data toggling process performed on the PC 1. The display data toggling process is performed to toggle the acquired Web page displayed in the operation screen of the browser to an alternate Web page when the Web page includes video ID data indicating that a video display command is included in the acquired Web page.

In S31 at the beginning of the display data toggling process, the CPU 11 determines whether the Web page acquired and stored in the Web page memory area 13b includes video ID data (see FIG. 2(c)).

Using the example in FIG. 2, when the CPU 11 acquires Web pagee A shown in FIG. 2(a), the CPU 11 determines whether any of the keywords included in the video ID data table stored in the video ID data table memory area 14c2 are included in Web pagee A. Since "object data" and "embed scr" are included in Web pagee A, the CPU 11 determines that the Web page includes video ID data.

If the CPU 11 determines in S31 that the acquired Web page does not include video ID data (S31: NO), the CPU 11 skips S32-S38 and in S39 displays, without change, text data, still images, video, and the like in the operation screen of the browser according to the Web page stored in the Web page memory area 13b, and subsequently ends the display data toggling process.

However, if the CPU 11 determines that the Web page includes video ID data (S31: YES), in S32 the CPU 11 initializes the link memory area 13d in the RAM 13, and in S33 executes the link extraction process described later. The link extraction process is performed to extract, from the acquired Web page, a URL for an alternate Web page associated with the acquired Web page but having greater potential for being voiced. When the CPU 11 is able to extract a URL for an alternate Web page through this link extraction process, the CPU 11 stores the extracted URL in the link memory area 13d of the RAM 13.

In S34 the CPU 11 determines if a URL for an alternate Web page could be extracted in the link extraction process of S33. If a URL could be extracted, i.e., if a URL is stored in the link memory area 13d (S34: YES), in S35 the CPU 11 sets the acquisition restriction flag in the acquisition restriction flag memory area 13c to "off." In S36 the CPU 11 acquires the Web page corresponding to the URL stored in the link memory area 13d and stores this Web page in the Web page memory area 13b so that an alternate Web page is not acquired from the Web server other than the Web server having the domain name stored in the domain name memory area 13e.

On the other hand, if a URL could not be acquired in S33, i.e., if the link memory area 13d holds no data (S34: NO), in S37 the CPU 11 sets the acquisition restriction flag to "on" in order to decrease the likelihood of acquiring Web pages unrelated to the currently acquired Web page or unrelated to an alternate Web page when it is instructed to acquire the identical Web page in S17. In S38 the CPU 11 copies the domain name in the URL stored in the URL memory area 13a to the domain name memory area 13e.

In S39 the CPU 11 displays text data, still images, video, and the like in the operation screen of the browser according to the Web page stored in the Web page memory area 13b, and subsequently ends the display data toggling process.

Through the display data toggling process described in FIG. 4(b), the CPU 11 can toggle the Web page displayed in the operation screen of the browser when a Web page was acquired from the CPU 11, based on whether the Web page includes a video display command. Specifically, when the acquired Web page includes video ID data, the CPU 11 acquires an alternate Web page, corresponding to the current Web page but having greater potential for being voiced, and displays the content of the alternate Web page in the operation screen of the browser.

Further, the CPU 11 sets the acquisition restriction flag to "on" when the acquired Web page includes video ID data but an alternate Web page could not be acquired. When the acquisition restriction flag is set to "on," the CPU 11 can only acquire Web pages from the Web server 100 having the same domain name provided in the URL of the acquired Web page.

Specifically, it is conceivable that Web pages related to the currently acquired Web page and alternate Web pages are stored on a Web server within the same network. Therefore, by restricting acquisition of Web pages to those from Web servers of a specific domain, it is possible to decrease the likelihood of acquiring Web pages unrelated to the currently acquired Web page or unrelated to an alternate Web page.

Next, the link extraction process (S33 of FIG. 4(b)) executed by the CPU 11 of the PC 1 will be described with reference to FIG. 5.

FIG. 5 is a flowchart illustrating steps in the link extraction process performed on the PC 1. This process is performed to extract, from the acquired Web page, a URL for an alternate Web page corresponding to the acquired Web page but having greater potential for being voiced.

In S41 at the beginning of the link extraction process, the CPU 11 determines whether the Web page stored in the Web page memory area 13b includes link ID data (see FIG. 2(d)) indicating whether the Web page includes a URL for an alternate Web page having greater potential for being voiced. If the CPU 11 determines that the acquired Web page does not include link ID data (S41: NO), the CPU 11 ends the link extraction process without performing steps S42-S45, that is, without storing a URL in the link memory area 13d.

However, if the acquired Web page includes at least one link ID data keyword (S41: YES), in S42 the CPU 11 determines whether the acquired Web page includes <a> </a> tags indicating a link.

If the acquired Web page does not include any <a> </a> tags (S42: NO), the CPU 11 ends the link extraction process without performing steps S43-S45, that is, without storing a URL in the link memory area 13d.

However, if the acquired Web page has at least one instance of <a> </a> tags indicating a link (S42: YES), in S43 the CPU 11 determines whether link ID data is included between the <a> </a> tags.

If link ID data exists between the <a> </a> tags (S43: YES), in S44 the CPU 11 stores the URL specified by the <a> </a> tags in the link memory area 13d, and subsequently ends the link extraction process.

For example, if the browser has acquired Web pagee A shown in FIG. 2(a), the CPU 11 determines in S41 that the Web page includes link ID data since the keywords "Display Text" and "Site Map" stored in the link ID data table shown in FIG. 2(d) are included in Web pagee A.

Further, since link ID data is included between the <a> </a> tags indicating a link, the CPU 11 determines in S42 and S43 that the URL C and URL D are URLs for alternate web pages and stores these URLs in the link memory area 13d. In the preferred embodiment, the CPU 11 searches for character strings in order from the top of the Web page and stores the first discovered URL in the link memory area 13d.

It is also possible to pre-assign an order of priority to link ID data, search the entire Web page for link ID data included therein, and store the URL corresponding to the link ID data with the highest priority in the link memory area 13d.

If the CPU 11 determines in S43 that no link ID data exists between the <a> </a> tags (S43: NO), in S45 the CPU 11 stores in the link memory area 13d the URL specified by the <a> </a> tags positioned the shortest distance, in terms of number of characters, from the position of link ID data in the acquired Web page. For example, if the URL C is not includes between the <a> </a> tags in FIG. 2(a), the CPU 11 stores the URL D in the link memory area 13d.

Through the link extraction process described in FIG. 5, the CPU 11 can extract a URL from a Web page acquired by the browser and store this URL in the link memory area 13d, where the URL is for an alternate Web page corresponding to the acquired Web page but has greater potential for being voiced.

Next, a browser according to a second embodiment of the present invention will be described with reference to FIG. 6.

The browser according to the second embodiment is installed on a PC 31. When launched, the browser acquires input operations performed on the PC 31. Based on characteristics of these input operations, the browser is configured to acquire an alternate Web page having greater potential for being voiced when the initial Web page acquired by the browser includes video display commands, and displays this alternate Web page in the operation screen of the browser.

Next, the electrical structure of the PC 31 according to the second embodiment will be described with reference to FIG. 6(a).

Figure 6A:
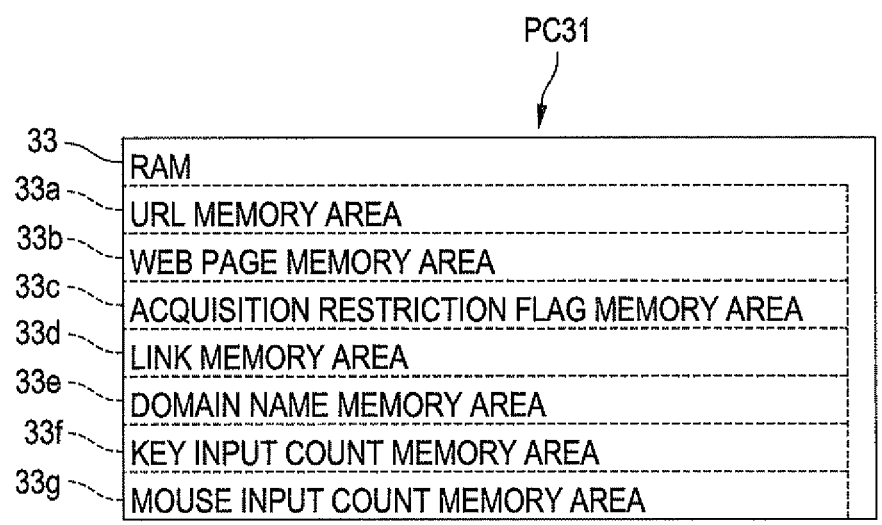
FIG. 6(a) is a block diagram showing the electrical structure of a PC according to a second embodiment of the present invention.

FIG. 6(a) is a block diagram showing the electrical structure of a RAM 33 provided in the PC 31. Since the PC 31 of the second embodiment differs from the PC 1 according to the first embodiment only in the RAM 33, only the RAM 33 will be described below.

The RAM 33 is provided with a URL memory area 33a, a Web page memory area 33b, an acquisition restriction flag memory area 33c, a link memory area 33d, a domain name memory area 33e, a key input count memory area 33f, and a mouse input count memory area 33g.

The URL memory area 33a, Web page memory area 33b, acquisition restriction flag memory area 33c, link memory area 33d, and domain name memory area 33e have the same structure and function as the URL memory area 13a, Web page memory area 13b, acquisition restriction flag memory area 13c, link memory area 13d, and domain name memory area 13e described in the first embodiment. Therefore, a description of these components will not be repeated here.

The key input count memory area 33f stores a count indicating the number of times the operator has performed a prescribed key operation (pressed a key, for example) on the keyboard 15. The count in the key input count memory area 33f is incremented by "1" each time the user performs a prescribed key operation on the keyboard 15, for example.

The mouse input count memory area 33g stores a count indicating the number of times the operator has performed a prescribed mouse operation (mouse click, for example) on the mouse 16. The count stored in the mouse input count memory area 33g is incremented by "1" each time the user performs a prescribed mouse operation on the mouse 16, for example.

Figure 6B:
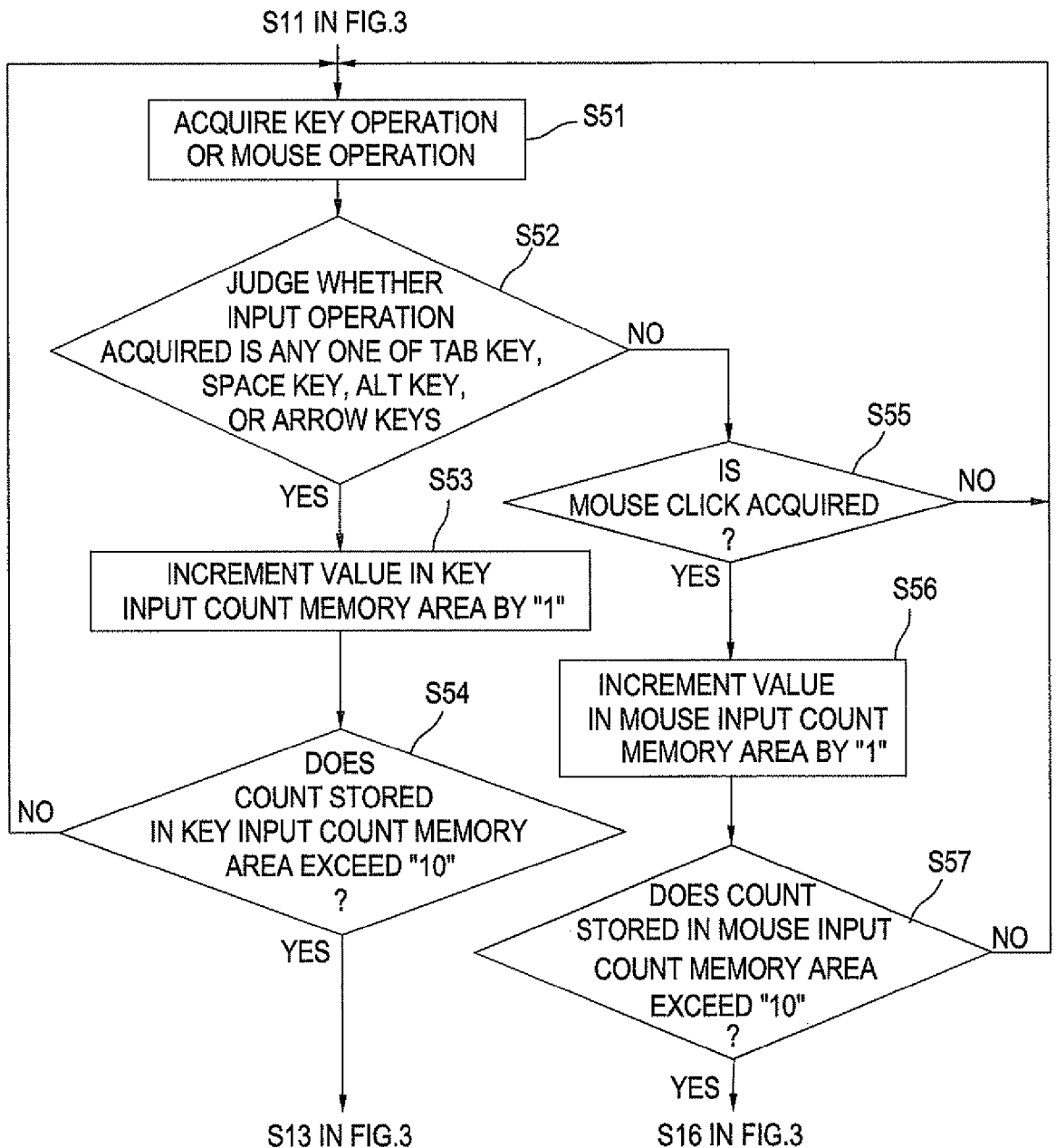
FIG. 6(b) is a flowchart illustrating steps in a main process performed on the PC according to the second embodiment.

Next, a main process executed by the CPU 11 of the PC 31 will be described with reference to FIG. 6(b). FIG. 6(b) is a flowchart illustrating steps in the main process performed on the PC 31.

The main process according to the second embodiment replaces the process in S12 of the main process according to the first embodiment (see FIG. 3) with the process in S51-S57 shown in FIG. 6(b). Accordingly, only the new steps shown in FIG. 6(b) will be described below, while a description of steps identical to those in the first embodiment will be omitted.

The main process is performed when the browser is launched to acquire an input operation performed on the keyboard 15 or the mouse 16 by the user. Based on characteristics of these input operations, the main process is performed to acquire and display an alternate Web page having greater potential for being voiced when the initially acquired Web page includes a video display command.

At the beginning of the main process in S11 of FIG. 3, the CPU 11 initializes the memory areas 33a-33g in the RAM 33.

Here, the operator also performs the key operation or mouse operation for other than the operation screen. In S51 of FIG. 6(b), the CPU 11 acquires a key operation performed with the keyboard 15 or a mouse operation performed with the mouse 16. Here, the CPU 11 simply acquires the key operation or mouse operation, regardless of whether the input operation was performed in the operation screen of the browser.

In S52 the CPU 11 determines whether the input operation acquired in S51 was any one of a Tab key, Control key and Tab key, Space key, Alt key, or Arrow keys. If the acquired input operation was one of the above keys (S52: YES), in S53 the CPU 11 increments the value in the key input count memory area 33f by "1".

In S54 the CPU 11 determines whether the count stored in the key input count memory area 33f exceeds "10". If the count exceeds "10" (S54: YES), then the CPU 11 advances to S13 in the flowchart of FIG. 3.

However, if the count is no greater than "10" (554: NO), then the CPU 11 returns to S51 and repeats the process in S51-S54 described above.

Further, if the CPU 11 determines in S52 that the acquired input operation is not one of the above listed operations (S52: NO), in S55 the CPU 11 determines whether the acquired input operation was a mouse click. If the acquired input operation was a mouse click (S55: YES), in S56 the CPU 11 increments the count in the mouse input count memory area 33g by "1". In S57 the CPU 11 determines whether the count stored in the mouse input count memory area 33g exceeds "5". If the count exceeds "5" (S57: YES), then the CPU 11 advances to S16 in the flowchart of FIG. 3.

However, if the CPU 11 determines in S55 that the acquired input operation was not a mouse click (S55: NO), the CPU 11 returns to S51 and repeats the process in S51-S55 described above. Further, if the CPU 11 determines in S57 that the count is no greater than "5" (S57: NO), then the CPU 11 returns to S51 and repeats the process in S51-S57 described above.

Since a visually impaired user has difficulty performing input operations while viewing the operation screen, it can be considered less likely that a visually impaired user would perform input operations with the mouse 16 in comparison to a sighted user. Further, since the sighted user can perform input operations while viewing the operation screen, the sighted user is probably more likely to perform input operations with the mouse 16 than a visually impaired user since tasks can be completed in fewer operations with the mouse 18 than with the keyboard 15.

Therefore, in the preferred embodiment the CPU 11 determines that a visually impaired user is operating the PC 31 when most input operations are performed with the keyboard 15, as determined in S44, and that a sighted user is operating the PC 31 when most input operations are performed with the mouse 16, as determined in S47.

Through the main process described in FIG. 6(b), the CPU 11 can acquire and display an alternate Web page having greater potential for being voiced when the initially acquired Web page includes a video display command based on the number of input operations performed with the keyboard 15 or the number of input operations performed with the mouse 16.

As described above, the browser according to the second embodiment sets the toggle flag in the toggle flag memory area 14c1 of the hard disk 14 to "on" when the number of input operations performed on the keyboard 15 exceeds a prescribed number (10, for example). Therefore, when a visually impaired user is performing input operations and the browser acquires a Web page including a video display command, the PC 31 can acquire an alternate Web page having greater potential for being voiced and can display this Web page content in the operation screen of the browser. Hence, this browser is convenient for visually impaired users according to the same reasons described in the first embodiment.

On the other hand, the browser sets the toggle flag stored in the toggle flag memory area 14c1 to "off" when the number of input operations performed on the mouse 16 exceeds a prescribed number (5, for example). Therefore, when a sighted user is performing input operations, video content is displayed in the operation screen of the browser, making the browser user-friendly to sighted users as well.

Next, a browser according to a third embodiment of the present invention will be described with reference to FIG. 7.

The browser according to the third embodiment is installed on a PC 41. When launched on the PC 41, the browser determines whether settings on the PC 41 were established for a visually impaired user. Based on the results of this determination, when the browser acquires a Web page including video display commands, the browser is configured to acquire an alternate Web page having greater potential for being voiced and to display the content of this alternate Web page in the operation screen of the browser.

Next, the electrical structure of the PC 41 according to the third embodiment will be described with reference to FIG. 7(a).

Figure 7A:
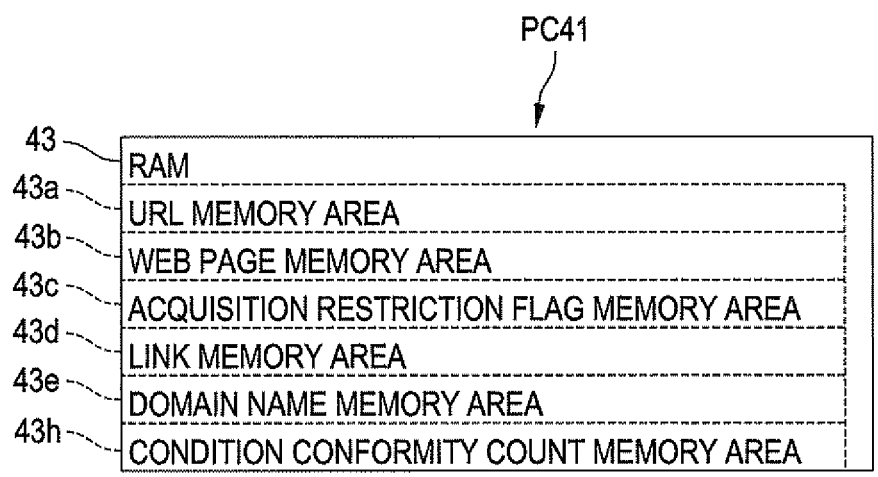
FIG. 7(a) is a block diagram showing the electrical structure of a PC according to a third embodiment of the present invention.

FIG. 7(a) is a block diagram showing the electrical structure of a RAM 43 provided, in the PC 41. Since the PC 41 of the third embodiment differs from the PC 1 according to the first embodiment only in the RAM 43, only the RAM 43 will be described below.

The RAM 43 is provided with a URL memory area 43a, a Web page memory area 43b, an acquisition restriction flag memory area 43c, a link memory area 43d, a domain name memory area 43e, and a condition conformity count memory area 43h.

The URL memory area 43a, Web page memory area 43b, acquisition restriction flag memory area 43c, link memory area 43d, and domain name memory area 43e have the same structure and function as the URL memory area 13a, Web page memory area 13b, acquisition restriction flag memory area 13c, link memory area 13d, and domain name memory area 13e described in the first embodiment. Therefore, a description of these components will not be repeated.

The condition conformity count memory area 43h stores a count indicating the number of user settings on the PC 41 performed to aid a user who is visually impaired. The count stored in the condition conformity count memory area 43h is incremented by "1", for example, for each user setting performed on the PC 41 to aid a visually impaired user, including the installation of software designed to aid a visually impaired person in using the PC, an OS setting to reduce the mouse cursor speed from the default value, and an OS setting to increase the size of the text displayed on the LCD 17 from the default value.

Next, a main process executed by the CPU 11 of the PC 41 will be described with reference to FIG. 7(b).

FIG. 7(b) is a flowchart illustrating steps in the main process performed on the PC 41. The main process according to the third embodiment replaces the process in S12 of the main process according to the first embodiment (see FIG. 3) with the process in S61-S69 shown in FIG. 7(b). Accordingly, only the new steps shown in FIG. 7(b) will be described below, while a description of steps identical to those in the first embodiment will be omitted.

The main process is performed when the browser is launched to determine whether settings on the PC 41 were established for a visually impaired user. The main process further serves to specify whether the browser should acquire and display an alternate Web page having greater potential for being voiced when the initially acquired Web page includes video display commands based on the determination results.

At the beginning of the main process in S11 of FIG. 5, the CPU 11 initializes the memory areas 43a-43e and 43h in the RAM 43. In S61 the CPU 11 determines whether the speed of mouse cursor movement in the OS settings is slower than the default setting established when the OS was installed. If the mouse cursor speed is set slower than the default setting (S61: YES), in S62 the CPU 11 increments the value stored in the condition conformity count memory area 43h by "1". However, if the mouse cursor is not set slower than the default setting (S61: NO), the CPU 11 skips S52 and advances to S63.

In S63 the CPU 11 determines whether the text size set in the OS settings for the size of text displayed on the screen is larger than the default setting established when the OS was installed. If the text size is set larger than the default setting (S63: YES), in S64 the CPU 11 increments the value in the condition conformity count memory area 43h by "1". However, if the text size is not set larger than the default setting (S63: NO), the CPU 11 skips S64 and advances to S65.

In S65 the CPU 11 determines whether a screen reader has been installed on the hard disk 14. If a screen reader has been installed on the hard disk 14 (S65: YES), in S66 the CPU 11 increments the value stored in the condition conformity count memory area 43h by "1". However, if a screen reader has not been installed (S65: NO), the CPU 11 skips S66 and advances to S67.

In S67 the CPU 11 determines whether the screen reader is running. If the screen reader is running (S67: YES), in S68 the CPU 11 increments the value stored in the condition conformity count memory area 43h by "1". However, if the screen reader is not running (S67: NO), the CPU 11 skips S68 and advances to S69.

In S69 the CPU 11 determines whether the count stored in the condition conformity count memory area 43h exceeds "2". If the count exceeds "2" (S69: YES), the CPU 11 advances to S13 in the flowchart of FIG. 3. However, if the count is no greater than "2" (S69: NO), the CPU 11 advances to S16 in the flowchart of FIG. 3.

Through the main process described in FIG. 7(b), the CPU 11 can acquire and display an alternate Web page having greater potential for being voiced when the initial Web page includes video display commands, based on the number of settings in the PC 41 established for a visually impaired user.

With the browser according to the third embodiment described above, the CPU 11 sets the toggle flag in the toggle flag memory area 14c1 to "on" after determining that the PC 41 has been set to aid a visually impaired user when the number of settings for a visually impaired user exceeds a prescribed number (2, for example). Accordingly, the CPU 11 can acquire an alternate Web page with greater potential for being voiced when the initially acquired Web page includes video display commands, and can display the content of the alternate Web page in the operation screen of the browser when the PC 41 has been set to aid visually impaired users. Hence, this browser is user-friendly for a visually impaired user for the same reasons described in the first embodiment.

However, when the number of settings designed for visually impaired users does not exceed the prescribed number, the CPU 11 of the PC 41 determines that the PC 41 has been set to aid a sighted user and, hence, sets the toggle flag stored in the toggle flag memory area 14c1 to "off." Accordingly, since video content is displayed in the operation screen of the browser when the PC 41 has been set up for a sighted user, this process is user-friendly for sighted users.

Although the present invention has been described with respect to specific embodiments, it will be appreciated by one skilled in the art that a variety of changes may be made without departing from the scope of the invention.

For example, while a browser application is described in the preferred embodiments, the present invention may also be applied to a plug-in program provided in an existing browser, such as Internet Explorer (registered, trademark) and Firefox (registered trademark), whereby the plug-in provides the browser with a function to acquire an alternate Web page having greater potential for being voiced when the initially acquired Web page includes video display commands and to display the acquired Web page in the operation screen of the browser.

Further, in the preferred embodiments described above, the browser acquires an alternate Web page with greater potential for being voiced when the initial Web page includes video display commands and displays the Web page in the operation screen of the browser. However, the browser may be configured to first display video in the operation screen and subsequently acquire an alternate Web page with greater potential for being voiced based on prescribed key input from the user (the Enter key, for example) and to display this alternate Web page in the operation screen. Since sound from the video will be outputted from the speaker 18 when the video is displayed in the operation screen, it would be possible to display the video and wait until the user performs the prescribed key input.

Further, while the CPU 11 determines whether the Web page acquired by the browser includes video ID data, the CPU 11 may instead determine whether the Web page includes video files that would be difficult to voice based on the extensions in the filenames. Examples of extensions for files difficult to voice are "swf" for Flash (registered trademark) files, "mov" and "qt" for QuickTime (registered trademark) files, and "class" or "js" for Java (registered trademark) applet files. Further, the CPU 11 may determine whether the Web page acquired by the browser includes video ID data and further determine whether files with the above extensions are provided between tags of a video display command identified by the video ID data, thereby increasing the accuracy for determining whether the Web page acquired by the browser includes video ID data.

Further, in S45 of FIG. 5 described above, the CPU 11 stores in the link memory area 13d the URL specified by the <a> </a> tags positioned in the acquired Web page closest to (i.e., the fewest number of characters from) a position including link ID data. However, the CPU 11 may instead store in the link memory area 13d the URL positioned within <noembed> </noembed> tags when <noembed> </noembed> tags exist in the Web page.

Further, while the browser acquires Web pages from the Web server 100 connected to the PC 1 via a network (the internet 300, LAN X 400, and the like) in the preferred embodiments described above, the browser may acquire Web pages stored on the hard disk 14 of the PC 1, as well. In this case, when the acquisition restriction flag memory area 13c is set to "on" based on a Web page acquired from the hard disk 14, the browser is restricted to acquiring Web pages from the hard disk 14. In addition, if an optical drive, memory card reader, external storage device, or the like is connected to the PC 1, the browser may acquire Web pages stored on storage media, such as a CD-ROM or memory card, or on the external storage device. In this case, when the acquisition restriction flag memory area 13c is set to "on" according to a Web page acquired from the optical drive, the browser is restricted to acquiring Web pages from the optical drive. Similarly, when the acquisition restriction flag memory area 13c is set to "on" based on a Web page acquired from the memory card reader or the external storage device, the browser is restricted to acquiring Web pages from the memory card reader or the external storage device, respectively.

Further, in S52 of FIG. 6 described in the preferred embodiments, the CPU 11 counts the number of times specific keys are pressed, but the present invention is not limited to these keys. Any keys may be counted, provided such keys are commonly used in the installation program and the OS.

Further, in the preferred embodiments described above, the main process according to the second embodiment (see FIG. 6(b)) and the main process according to the third embodiment (see FIG. 7(b)) replace S12 in the main process according to the first embodiment (see FIG. 3) with a different process. However, the main processes in the second and third embodiments may combine both the replacement processes (S51-S57 and S61-S69) with the process in S12. Specifically, when the CPU 11 determines in S12 of FIG. 3 that a screen reader has been installed (S12: YES), the CPU 11 may advance to S51 of FIG. 6(b) or S61 of FIG. 7(b). Further, when the value stored in the key input count memory area 33f exceeds "10" in S54 of FIG. 6(b), the CPU 11 may advance to S12 of FIG. 3 or S61 of FIG. 7(b). Alternatively, when the CPU 11 determines in S69 of FIG. 7(b) that the value stored in the condition conformity count memory area 43h of the RAM 43 exceeds "2", the CPU 11 may advance to S12 of FIG. 3 or S51 of FIG. 6(b).

What is claimed is:

1. A method executed in a data processing device connected to a web data providing unit, the data processing device including a displaying unit that displays a web page; a pointing device; and a key inputting unit having Tab key, Space key, Alt key, and Arrow key, the method comprising:

counting a number of times an input operation is performed with the key inputting device;

displaying a dialog box on the displaying unit when the number of times the input operation is performed with the key inputting device exceeds a first predetermined number, the dialog box having a text, a first button, and a NO button, the text indicating a message prompting a user to confirm whether to acquire an alternate web page;

determining whether or not the first button is pressed with the pointing device;

setting a toggle flag to ON when it is determined that the first button is pressed with the pointing device;

counting a number of times an input operation is performed with the pointing device;

determining whether or not the number of times the input operation is performed with the pointing device exceeds a second predetermined number;

setting the toggle flag to OFF when it is determined that the number of times the input operation is performed with the pointing device exceeds the second predetermined number or when it is determined that the first button is pressed with the pointing device;

acquiring first web page data for displaying first web page from the web data providing unit via a network, the first web page including a first information region, the first web page data including first displaying information and URL information, the first displaying information for displaying a first image that cannot be voiced by a screen reader on the first information region, the URL information for obtaining second web page data for displaying a second web page on the displaying unit, the first image that cannot be voiced by the screen reader being displayed on the first information region based on the first displaying information contained in the first web page data, the second web page including a second information region, the second web page data including second displaying information for displaying a second image that can be voiced by the screen reader on the second information region, a matter indicated by the second image displayed on the second information region being substantially identical to a matter indicated by the first image displayed on the first information region;

determining whether the toggle flag is set to ON or OFF after the first web page data is acquired;

when the toggle flag is determined to be ON, acquiring the second web page data using the URL information contained in the first web page data and displaying the second web page based on the second web page data; and when the toggle flag is determined to be OFF, displaying the first web page based on the first web page data without acquiring the second web page data using the URL information.

2. The method according to claim 1, wherein the second web page data is video data.

3. The method according to claim 1, wherein the voice data is text data which the screen reader can voice.

4. The method according to claim 1, wherein the text of the first web page fails to correspond to the voicing data; and wherein the method further comprises: determining whether or not at least one of the first button and the NO button is pressed within a preset period after the dialog box is displayed; and setting the toggle flag to ON when it is determined that neither the first button nor the NO button is pressed.

5. The method according to claim 1, further comprising:

specifying URL information having text information corresponding to the second web page among a set of URL information when the first web page data includes the set of URL information;

wherein the second web page data is acquired by using the specified URL information and displaying the second web page based on the second web page data if it is determined that the toggle flag is set to ON.

6. The method according to claim 5, wherein the text information associated with the URL corresponding to the second web page includes at least one of a "text", "skip", "map" and "index".

7. The method according to claim 1, wherein the first displaying information is data for displaying a video image on the first information region as the first image.

8. The method according to claim 1, wherein the second displaying information is data for displaying a text on the second information region as the second image.

9. A computer readable storage device storing a set of program instructions executable on a data processing device connected to a web data providing unit, the data processing device including a displaying unit that displays a web page; a pointing device; and a key inputting unit having Tab key, Space key, Alt key, and Arrow key, the instructions comprising:

counting a number of times an input operation is performed with the key inputting device;

displaying a dialog box on the displaying unit when the number of times the input operation is performed with the key inputting device exceeds a first predetermined number, the dialog box having a text, a first button, and a NO button, the text indicating a message prompting a user to confirm whether to acquire an alternate web page;

determining whether or not the first button is pressed with the pointing device;

setting a toggle flag to ON when it is determined that the first button is pressed with the pointing device;

counting a number of times an input operation is performed with the pointing device;

determining whether or not the number of times the input operation is performed with the pointing device exceeds a second predetermined number;

setting the toggle flag to OFF when it is determined that the number of times the input operation is performed with the pointing device exceeds the second predetermined number or when it is determined that the first button is pressed with the pointing device;

acquiring first web page data for displaying first web page from the web data providing unit via a network, the first web page including a first information region, the first web page data including first displaying information and URL information, the first displaying information for displaying a first image that cannot be voiced by a screen reader on the first information region, the URL information for obtaining second web page data for displaying a second web page on the displaying unit, the first image that cannot be voiced by the screen reader being displayed on the first information region based on the first displaying information contained in the first web page data, the second web page including a second information region, the second web page data including second displaying information for displaying a second image that can be voiced by the screen reader on the second information region, a matter indicated by the second image displayed on the second information region being substantially identical to a matter indicated by the first image displayed on the first information region;

determining whether the toggle flag is set to ON or OFF after the first web page data is acquired;

when the toggle flag is determined to be ON, acquiring the second web page data using the URL information contained in the first web page data and displaying the second web page based on the second web page data; and when the toggle flag is determined to be OFF, displaying the first web page based on the first web page data without acquiring the second web page data using the URL information.

10. A data processing device connected to a web data providing unit, comprising:

a controller;
a memory storing a program;
a displaying unit that displays a web page;
a pointing device; and
a key inputting unit having Tab key, Space key, Alt key, and Arrow key;

wherein the program causes the controller to perform:

counting a number of times an input operation is performed with the key inputting device;

displaying a dialog box on the displaying unit when the number of times the input operation is performed with the key inputting device exceeds a first predetermined number, the dialog box having a text, a first button, and a NO button, the text indicating a message prompting a user to confirm whether to acquire an alternate web page;

determining whether or not the first button is pressed with the pointing device;

setting a toggle flag to ON when it is determined that the first button is pressed with the pointing device;

counting a number of times an input operation is performed with the pointing device;

determining whether or not the number of times the input operation is performed with the pointing device exceeds a second predetermined number;

setting the toggle flag to OFF when it is determined that the number of times the input operation is performed with the pointing device exceeds the second predetermined number or when it is determined that the first button is pressed with the pointing device;

acquiring first web page data for displaying first web page from the web data providing unit via a network, the first web page including a first information region, the first web page data including first displaying information and URL information, the first displaying information for displaying a first image that cannot be voiced by a screen reader on the first information region, the URL information for obtaining second web page data for displaying a second web page on the displaying unit, the first image that cannot be voiced by the screen reader being displayed on the first information region based on the first displaying information contained in the first web page data, the second web page including a second information region, the second web page data including second displaying information for displaying a second image that can be voiced by the screen reader on the second information region, a matter indicated by the second image displayed on the second information region being substantially identical to a matter indicated by the first image displayed on the first information region;

determining whether the toggle flag is set to ON or OFF after the first web page data is acquired;

when the toggle flag is determined to be ON, acquiring the second web page data using the URL information contained in the first web page data and displaying the second web page based on the second web page data;

and when the toggle flag is determined to be OFF, displaying the first web page based on the first web page data without acquiring the second web page data using the URL information.

* * * * *